Jan. 27, 1970  J. S. ENGELHARDT ETAL  3,491,597
TEMPERATURE MONITORED CABLE SYSTEM AND METHOD
Filed Sept. 20, 1966
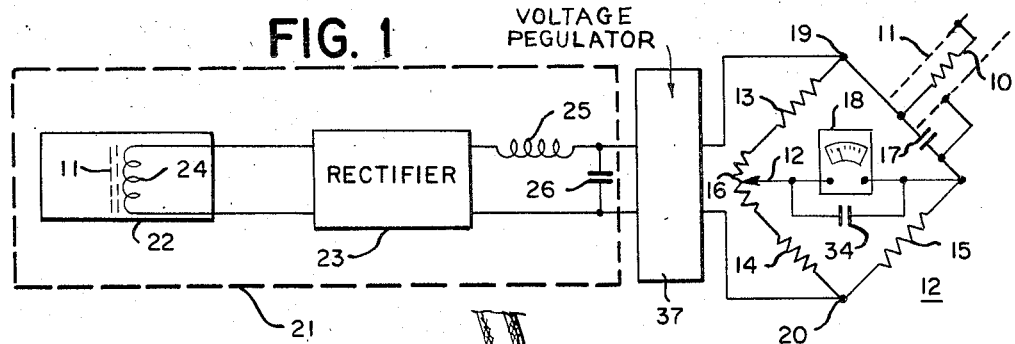
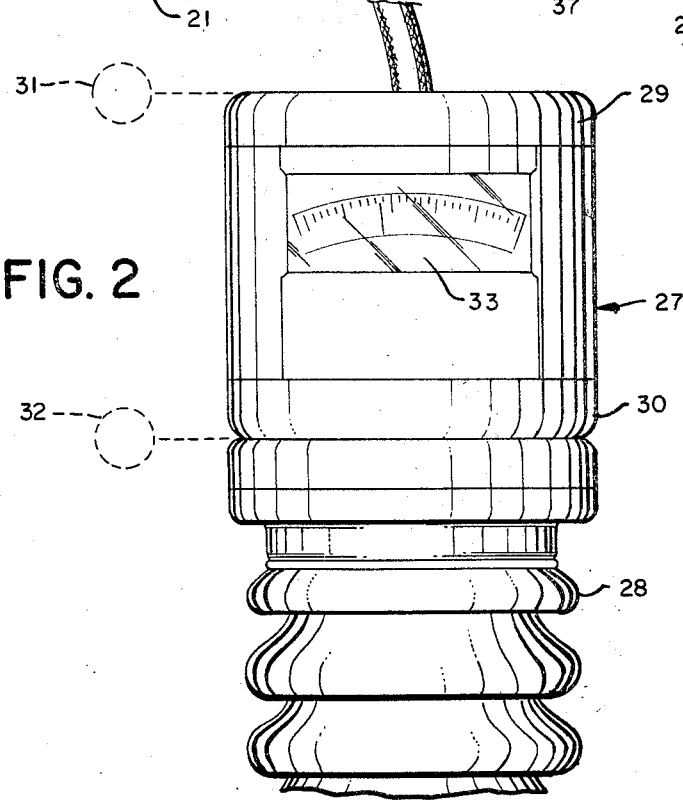
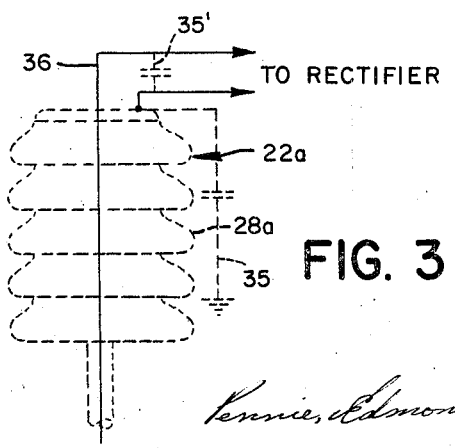
INVENTORS
JOHN SHERMAN ENGELHARDT
LAWRENCE CHARLES EBEL
BY
*Kennie, Edmonds, Morton, Taylor & Adams*
ATTORNEYS

United States Patent Office 3,491,597
Patented Jan. 27, 1970

3,491,597
TEMPERATURE MONITORED CABLE SYSTEM AND METHOD
John Sherman Engelhardt, Hartsdale, and Lawrence Charles Ebel, Hastings-on-Hudson, N.Y., assignors to Anaconda Wire and Cable Company, New York, N.Y., a corporation of Delaware
Filed Sept. 20, 1966, Ser. No. 580,762
Int. Cl. G01k 5/18, 5/52
U.S. Cl. 73—362      9 Claims

ABSTRACT OF THE DISCLOSURE

A device to measure the average temperature of a length of current carrying conductor, particularly high tension cables. A pilot wire having a conductivity which varies according to its temperature is provided in thermal communication with the conductor along its entire length, so that the conductor and the pilot wire are at essentially the same temperature but are electrically insulated from one another. The conductance of the pilot wire, and consequently the average temperature of the conductor, is measured by a meter mounted in a shielded housing formed integrally with a pothead which terminates the length of conductor. The shielded housing includes an electrically conductive exterior having rounded corners for corona shielding, and a magnetic shield. The temperature or other value indicated is read through a transparent electrically conductive window in the wall of the housing.

---

This invention relates to apparatus for measuring the temperature of an electrical conductor, and more particularly to apparatus for measuring the average temperature along a length of current carrying conductor by sensing the change in conductance of a pilot conductor embedded in the length of conductor.

It is often desirable to monitor the conductor temperature of electrical transmission lines, and particularly to have information on the temperature of relatively long lengths of sheathed high tension transmission cables. Underground cable installations, for instance, particularly in arid locations, impose severe restraints on the thermal ratings of transmission cables. In such locations, the moisture content of soils is low and unpredictably variable so that thermal design calculations cannot be as accurate as is desirable. In certain climates, the unpredictability of weather conditions makes it desirable to keep a continuous watch on the temperature of transmission lines.

It is known to measure, for instance by thermocouples, the temperature at various points along the sheath of a transmission line, and this provides accurate temperature information at those discrete points. Conductor temperatures have, in the past, been derived from tables based on laboratory measurements of cable properties, field measurements of soil and weather conditions over the intended right of way, and general experience. A direct knowledge of the average conductor temperature is useful not only as an indication of operating temperature, but to provide a more accurate understanding of the thermal properties of transmission systems. It is not feasible, however, to provide a sufficient number of thermocouples to determine the temperature distribution along a transmission line.

It has been discovered that an accurate and instantaneous indication of average temperature along a given length of transmission line conductor can be determined by measuring the temperature-dependent changes in conductance of conductive means in the form of a pilot wire embedded in or otherwise maintained in thermal communication with the conductor. Such wire is embedded in the conductor when it is manufactured, and is electrically insulated from but in thermal communication with the conductor.

It is advantageous to electrically short-circuit the pilot wire to the conductor at one end of the length to be monitored, whereby the cable itself may be used as a return conductor. Since the cable conductor and the pilot wire are at the same temperature, any error is eliminated which might otherwise be present due to a temperature difference between the pilot wire and return conductor.

According to the invention, power for making the conductance measurement is derived from the cable itself, for instance through a transformer coupling to the current carrying conductor. Since DC current is used for the measurement, the AC current derived from the cable may be rectified, and, if desired, regulated before being fed to the measuring apparatus. According to one feature of the invention, the complete apparatus for measuring average temperature is mounted on a pothead, so that instantaneous, reliable measurements may be directly obtained in the field. This precludes any measurement error from sources between the sensor (the pilot wire in this case) and the measuring equipment. The housing for the apparatus on the pothead should be electrostatically and magnetically shielded for acurate readings. A window may be provided in the housing directly in front of the measurement display means, so that, for instance, if the pothead is high above ground, readings may be taken visually through a telescope. The apparatus may be contained in a housing mounted on the pothead, as shown in the accompanying drawings, or may be contained in a housing formed by an extension of the pothead itself.

The invention will be further described with reference to the accompanying drawings, in which:

FIG. 1 is a circuit diagram of an embodiment of the invention utilizing a Wheatstone bridge circuit;

FIG. 2 is an elevational view of temperature measuring apparatus housed in a pothead according to the invention;

FIG. 3 is a circuit diagram showing an alternate way of obtaining power for the measurement.

FIG. 1 shows an embodiment of the invention in which the degree of imbalance of a Wheatstone bridge is taken as an indication of the conductivity change of the pilot wire. A pilot wire 10 is embedded in the current carrying conductor indicated schematically as 11 when the latter is manufactured. The pilot wire should be of the same material as the conductor itself, so that there will be no relative coefficient of expansion between the two, and to minimize error from thermoelectric effects. Since the method of the invention is based on the assumption that the pilot wire and the conductor to be monitored are at the same temperature, the electrical insulation between pilot wire and conductor must permit thermal communication between them. If the cable insulation is oil saturated, the pilot wire insulation should be insoluble in such oil. Nylon and cotton may be used for insulation. The pilot wire may conveniently be run along the axis of the conductor 11. The pilot wire 10 may be shorted to the conductor at one end of the length of cable to be monitored; this will be the end distant from the point at which the measuring apparatus is connected. At the other end of the length of cable, the pilot wire is brought out of the pothead through a pressure fitting (not shown). The pilot wire 10 and the return conductor 11 (in this embodiment one of the conductors of the cable) are connected in series as one arm of the Wheatstone bridge 12. The other three arms may comprise fixed resistors 13, 14, and 15 as well as a resistor 16 with a variable center tap 12 for setting the bridge at the null point. A meter 18, which in this embodiment is a milliammeter, is connected across one bridge diagonal, and a DC voltage is applied across the other bridge diagonal, between terminals 19 and 20. The DC current source, shown schematically by the broken line 21, includes an AC power source 22 and a rectifier 23. The AC power source in FIG. 1 is a transformer, the primary winding of which is the current carrying conductor 11 of the transmission cable. The secondary winding 24 of the transformer is connected to the output terminals of the AC power source 22, which are connected to a rectifier 23. The rectifier 23 in FIG. 1 may be a full wave diode bridge circuit such as is well known in the art.

A voltage regulator 37 may be connected to the output of the rectifier 23 for providing a constant DC output to the Wheatstone bridge terminals 19 and 20. Such regulators are well known in the art.

Suitable filtering means is provided at the output of the rectifier for smoothing the output of the latter. Such filtering means in FIG. 1 includes an inductance 25 and a capacitance 26. Additional filtering is provided by a large capacitor 17 connected across the series-connected pilot wire and return conductor for eliminating any AC currents inductively generated in either of those conductors.

The DC current source 21 may alternatively be a constant voltage battery, which may be charged by current derived from the AC current in the cable conductor 11.

As shown in FIG. 2, the apparatus shown schematically in FIG. 1 is mounted in a housing 27 formed as an extension of a pothead 28 which terminates the length of conductor 11. The housing may be made of aluminum or any electrically conductive material, and its edges sould be rounded to form corona shields 29 and 30. If further corona shielding is found necessary, corona rings 31 and 32 (indicated schematically) may be added to the housing. A window 33 forms part of the housing 27, and is preferably made of electrically conductive glass for electrostatic shielding. The full electrostatic shielding thus provided eliminates capacitance coupling between the meter 18 at high voltage and ground, which otherwise would cause pointer vibration. Magnetic shielding from the fields generated by the conductor current may also be provided by means of a laminated iron casing (not shown) around three sides of the apparatus. In addition, wire within the apparatus as well as all components thereof should be positioned to minimize any inductive pickup from the circumferential magnetic field.

To prevent the meter 18 from exposure to damage from AC or surge currents, a large capacitance 34 may be connected (FIG. 1) in parallel with the meter 18. A large inductance (not shown), may be placed in series with the meter 18. The time constant of the capacitance 34 and the inductance should be made large, to afford maximum protection for the meter 18.

FIG. 3 shows an alternative AC power sources 22a for deriving AC power from the capacitance current between the pothead 28a and ground. The capacity between the pothead 28a and ground may be represented by an equivalent capacitance 35. If the cable which the pothead 28a terminates operates at about 345 kv., the equivalent capacitance 35 may have a value of about 300 picofarads. If the input of the rectifier 23 is connected between the high voltage lead 36 and the pothead 28a, sufficient current will flow to the rectifier 23 to obtain a measurement.

The potentiometer 16 should be adjusted after installation of the apparatus so that the meter 18 reads substantially zero (i.e. the bridge is nulled) at some convenient reference temperature below the temperature range over which the conductor is expected to operate. Any increase in the average conductor temperature will then produce an increase in the resistance of the pilot wire 10, which increase will cause deflection of the meter 18 by unbalancing the bridge. The degree of imbalance may be empirically related to the rise in temperature of the pilot wire at any known value of current in the conductor 11. Thus by noting the value of the current through milliammeter 18 the average temperature of the pilot wire (and thus of the length of conductor in which it is embedded) is known.

The embodiment described herein lends itself to being mounted high above the ground, on a cable support structure, since the meter 18 may be easily read from the ground through a telescope. In making any measurement, the DC current applied to the Wheatstone bridge must be known. This may be predetermined by providing the above-mentioned voltage regulator, or may be determined from the AC current in the cable at the instant of measurement, the transfer function of the DC current source being known. In addition to visual monitoring, the temperature may be remotely monitored by connecting the bridge output signal (i.e. the current through the meter 18) to a modulator such that the bridge output modulates a carrier signal, which may then be sent over a telephone line or otherwise transmitted. Alternatively, radio, audio or visual carriers may be modulated by the bridge output signal.

From a knowledge of the average temperature at any given time as well as the thermal characteristics of various segments of the length of cable being monitored, the temperature at any given point on that cable may be accurately estimated.

In the circuit of FIG. 1, if a length of cable approximately 3,000 feet in length is to be monitored, and the pilot wire shown is about #18 copper wire, the series resistance of the pilot wire and the conductor 11 at 25° centigrade will be about 18 ohms. In this case, resistances 13 and 14 may be 18 and 15 ohms respectively, and resistance 15 may be 15 ohms. The meter 18 may then be a milliammeter which reads 50 ma. full scale.

It will be apparent that the invention is not limited to the specific features in the above-described preferred embodiments, and that various modifications may be made.

We claim:

1. Apparatus for measuring the average temperature of a length of current carrying conductor terminating at one end in a pothead, said apparatus comprising:
   conductive means, the conductivity of which varies according to its temperature, electrically insulated from the current carrying conductor and in thermal communication with said conductor along substantially its entire length, so that the conductor and the conductive means are at essentially the same temperatures;
   a housing integral with such pothead for excluding external electric and magnetic fields, said housing being formed of an electrically conductive material and provided with corona shielding means, including rounded edges, and a magnetic shield for excluding magnetic fields therefrom; and
   means mounted in said housing for measuring the conductance of said conductive means.

2. Apparatus as defined in claim 1 wherein said housing includes an electrically conductive window, said apparatus including means connected to said measuring means and mounted in said housing for displaying through said window the measured conductance of the conductive means.

3. Apparatus as defined in claim 1 wherein said measuring means includes a source of DC current supplying current to the conductive means, said DC current source including means for deriving AC power from the current carrying conductor and means for rectifying said AC power to produce said DC current.

4. Apparatus as defined in claim 3 wherein said AC power deriving means is a transformer coupled to the current carrying conductor.

5. Apparatus as defined in claim 3 wherein said AC power deriving means comprises means connecting the rectifying means between the pothead and the current carrying conductor, whereby due to the inherent capacitance between the pothead and ground, a capacitance current flows through the rectifying means.

6. In apparatus for electrically measuring and indicating the value of a parameter characterizing a current carrying cable, which cable terminates at one end in a pothead, the improvement comprising a housing integral with such pothead for excluding external electric and magnetic fields, said housing being formed of an electrically conductive material and including a transparent electrically conductive window therein and provided with corona shielding means, including rounded edges, and a magnetic shield for excluding magnetic fields from the interior thereof, and means for indicating the value of such parameter mounted in said housing and disposed to be read visibly from without the housing.

7. Apparatus for measuring the average temperature of a length of current carrying conductor, comprising:

conductive means, the conductivity of which varies according to its temperature, electrically insulated from the current carrying conductor and in thermal communication therewith along substantially its entire length, so that the conductor and the conductive means are at essentially the same temperature;

means for measuring and displaying the measured conductance of the conductive means; and a source of DC current supplying current to the conductive means including means for deriving AC power from the current carrying conductor and for rectifying said AC power to produce said DC current, said AC power deriving means being a transformer, the primary winding of which is said current carrying conductor, and said measuring means includes a Wheatstone bridge circuit, one arm of which includes said length of current carrying conductor connected in series with the conductive means, said DC current source being connected diagonally across the Wheatstone bridge circuit for supplying current thereto.

8. Apparatus for measuring the average temperature of a length of current carrying conductor terminating at one end in a pothead, said apparatus comprising:

conductive means, the conductivity of which varies according to its temperature, electrically insulated from the current carrying conductor and in thermal communication with said conductor along substantially its entire length, so that the conductor and the conductive means are at essentially the same temperatures;

a housing integral with such pothead for excluding external electric and magnetic field, said housing being formed of an electrically conductive material and provided with corona shielding means, including rounded edges, and a magnetic shield for excluding magnetic fields therefrom and having a transparent, electrically conductive window; and means mounted in said housing for measuring and indicating through said window the conductance of said conductive means, said measuring means including a source of DC current supplying current to the conductive means, said DC current source including means for deriving AC power from the current carrying conductor and means for rectifying said AC power to produce said DC current, said measuring means including a Wheatstone bridge circuit, one arm of which includes the length of current carrying conductor connected in series with the conductive means, said DC current source being connected diagonally across the Wheatstone bridge circuit for supplying current thereto.

9. Apparatus for measuring the average temperature of the length of current carrying conductor, comprising:

conductive means, the conductivity of which varies according to its temperature, electrically insulated from the current carrying conductor and in thermal communication therewith along substantially its entire length, so that the conductor and the conductive means are at essentially the same temperature;

means for measuring and displaying the measured conductance of the conductive means; and a source of DC current supplying current to the conductive means, said measuring means including a Wheatstone bridge circuit, one arm of which includes said length of current carrying conductor connected in series with the conductive means, said DC current source being connected diagoally across the Wheatstone bridge circuit for supplying current thereto.

References Cited
UNITED STATES PATENTS

| | | | |
|---|---|---|---|
| 1,917,129 | 7/1933 | Kirch | 174—11 |
| 2,649,715 | 8/1953 | Goble. | |
| 2,817,235 | 12/1957 | Hunter et al. | 73—342 |
| 3,273,396 | 9/1966 | Beck. | |
| 3,347,098 | 10/1967 | Bielstein et al. | |

LOUIS R. PRINCE, Primary Examiner

F. SHOON, Assistant Examiner

U.S. Cl. X.R,

73—342